Sept. 1, 1931. C. J. HAHN 1,821,215
FLEXIBLE COUPLING
Filed March 8, 1930 2 Sheets-Sheet 1
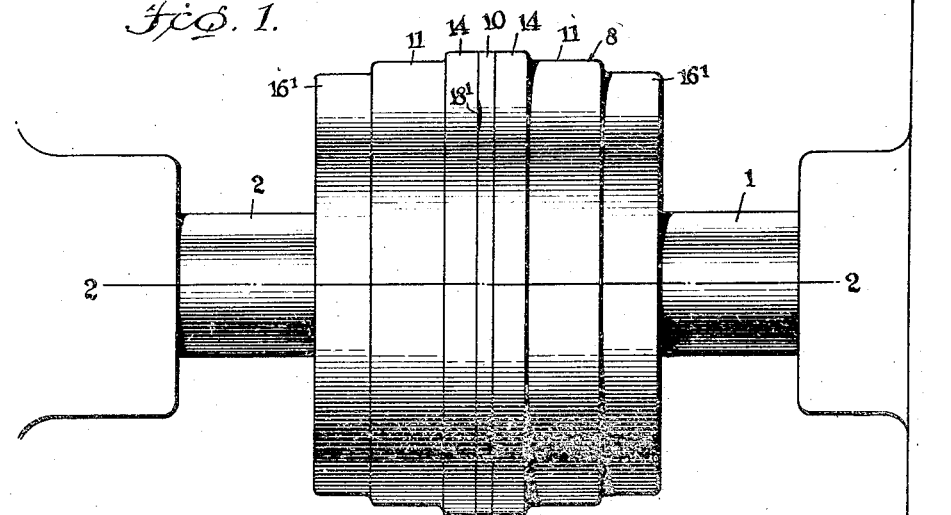
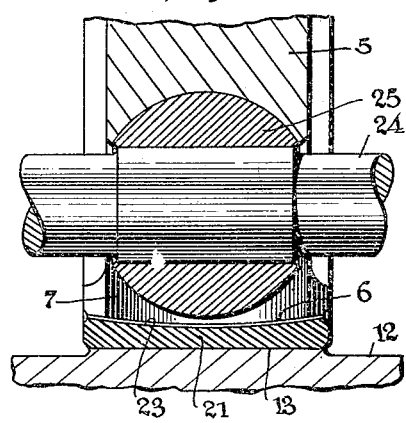
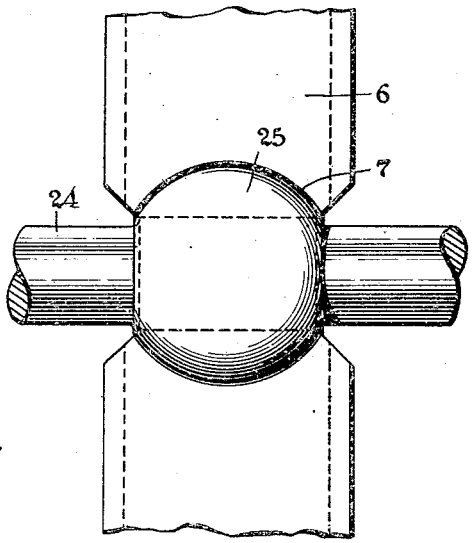
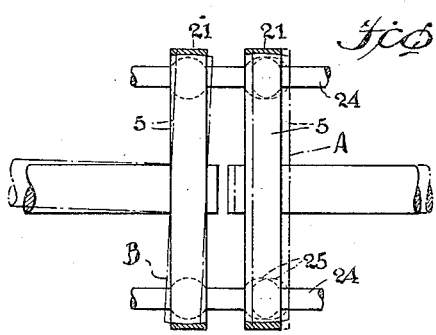
Inventor
Clarence J. Hahn,
By Barton A. Bean Jr
Attorney Sept. 1, 1931.   C. J. HAHN   1,821,215
FLEXIBLE COUPLING
Filed March 8, 1930   2 Sheets-Sheet 2
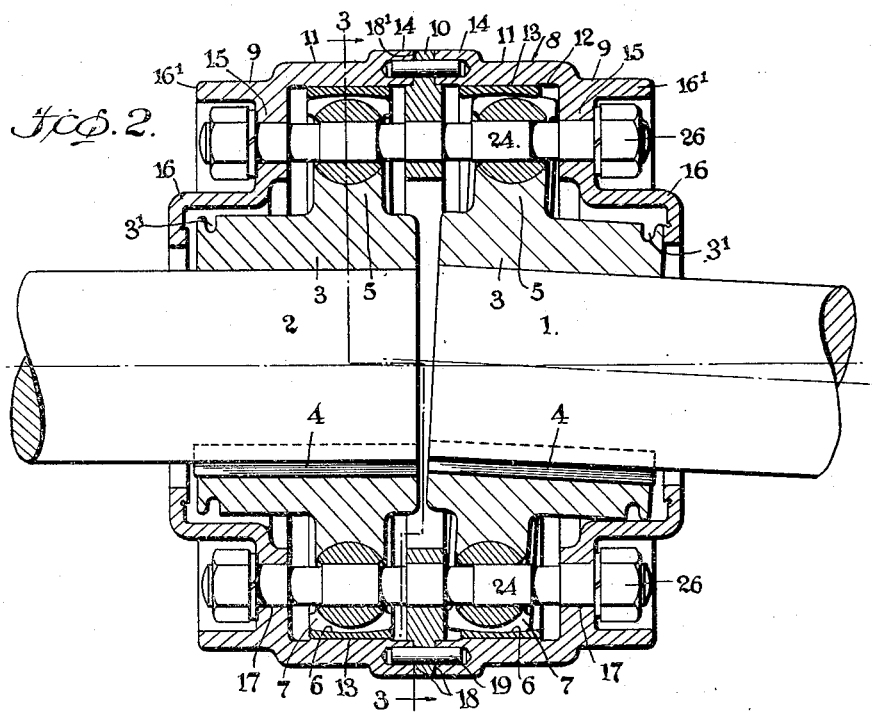
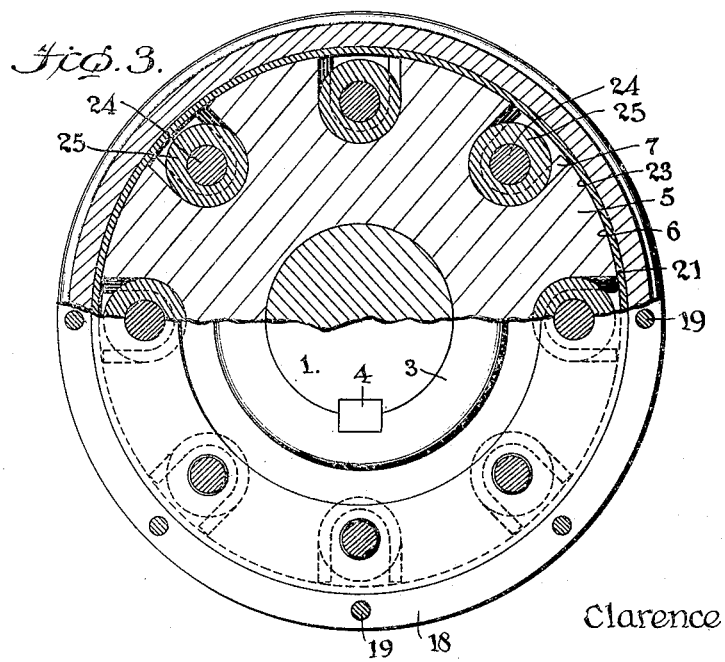
Inventor
Clarence J. Hahn,
By Barton A. Beau Jr.
Attorney Patented Sept. 1, 1931

1,821,215

UNITED STATES PATENT OFFICE

CLARENCE J. HAHN, OF BUFFALO, NEW YORK

FLEXIBLE COUPLING

Application filed March 8, 1930. Serial No. 434,379.

This invention relates to flexible coupling devices and more particularly to devices for coupling misalined shafts.

Referring more particularly to all metal types of flexible coupling, it has been found that prior devices have been faulty in several details, the outstanding of which has been the lack of attention to the important factor of wearing surfaces. For example, in the well known types of all metal couplings it has been found that the working surfaces in contact tend to wear grooves or "pots" thus producing stresses in the materials that shorten the life of the coupling and its connecting units. It also has been found that in the more properly designed couplings the number of parts have been increased with the accompanying difficulty of assembling.

One of the prime objects of the present invention is to provide a new and novel arrangement of parts in the coupling enabling a more perfect distribution of load and also permitting of the proper arrangement of wearing surfaces to ensure longevity and correct operation of the coupling.

Another object is through simplicity of design to allow for easy assembling and disassembling of the coupling.

Another object is to provide for "floating" or longitudinal movement of the shafts.

A further object is to provide an extremely rugged device which will resist the torque load in as efficient manner as the shafts themselves.

These and other objects and qualities of the present device are more completely shown and described in the accompanying drawings and specification.

In the drawings:

Fig. 1 is an elevation showing the coupling connecting the driving and a driven shaft.

Fig. 2 is a section on the line 2—2 of Fig. 1.

Fig. 3 is a section on the line 3—3 of Fig. 2.

Fig. 4 is an enlarged view of portions of Fig. 2.

Fig. 5 is a partial end view of the assembly of a spherical bushing with the hub.

Fig. 6 is a diagrammatic view showing the principles of operation of the present device.

In the drawings, the numerals 1 and 2 indicate a driving and a driven shaft respectively which are connected by the coupling of the present device. On the end of each shaft a hub 3 is secured by a key 4 each hub being provided with a circular flange 5 which at its periphery has a bearing surface 6 which is arcuate and of a radius struck from the center of the shaft. This surface is slightly wider than the main body of the flange and forms a rim therefor. The outer ends of the hub contain a cut flange 3' which acts as an oil conductor. A number of angularly spaced radial slots 7 extend inwardly into the flange of the bearing surface 6. The bottoms and seats of these slots are concave or partly spherical in shape and the side walls extending inwardly to such seats are radial.

The housing 8 which encloses the hubs is a built-up structure comprising two shell members 9 and a connecting member 10. Each shell member includes an outer cylindrical flange 11, the inner wall 12 of which contains a cylindrical finish pad 13 hereinafter described. The outer end of the flange 11 contains a lip 14 which is longitudinally drilled at spaced intervals. The opposite end of the flange 11 connects to a depending wall 15 which in turn connects to an L-shaped flange portion 16 which generally follows the contour of the underlying hub. A longitudinal guard flange 16' connects to the wall 15 and is spaced slightly below the flange 11. The wall 15 between the flanges 16 and 16' contains rod holes 17 which are circumferentially spaced about the axis of the shell. The connecting member is disk-like in shape and contains shouldered portions 18 which receive the lip portion 14 of the shell in assembly, and which is also drilled in similar manner to said lip portion to receive the dowel pins 19 which extend through and connect the members. One of the shouldered portions is slightly cut back at 18' to provide for the insertion of a tool therein to facilitate disassembly. The connecting member also contains spaced holes in registry horizontally with the rod holes 17 of the shell.

The finish pad 13 of the shell is adapted to slidably receive the ring bushing 21 which is slidably mounted therein and contains an arcuate bearing surface 23 which is adapted to receive the flange of hub 3 and to engage bearing surface 6 thereof in full contact therewith. It is preferred that the portion of the bushing 21 contacting with the finish pad 13 be substantially equal in width thereto, (Fig. 4), so that upon axial sliding movement relative to each other the surfaces in contact will be completely wiped, thus obviating the possibility of grooving.

The actuator or transmission rods 24 extend through the housing as previously described and are secured in place by the nuts 26 which extend between the flanges 16 and 16' of the shell. The transmission rods also extend through the slots 7 in the flanges 5 and slidably receive spherical bushings 25 which are adapted to register with the seat 8 of said slot in sliding contact therewith. The said rods are preferably relieved between the portions thereof which contact with the spherical bushings in a similar manner to the arrangement of the bushings 21 on the finish pads 13. Thus, all of the contacting bearing surfaces in this coupling contact with bearing surfaces of axially equal widths.

In operation, if the shafts are perfectly alined, the drive shaft 1 transmits its motion to its hub 3 and then, through the spherical bushing 25, imparts such action on the transmission rods 24 which in turn drive the housing and the hub 3 of the driven shaft 2. If one or both of the shafts has a tendency to float or move slightly axially during each revolution, the axial movement is taken up by the ring bushing 21 which slides on the finish pad 13 of the housing, and by the simultaneous sliding of the spherical bushings on the rods 24. The position shown as "A" in Fig. 6 illustrates this operation. Another condition which is anticipated in the present invention is the misalinement or angular displacement of shafts. The position "B" of Fig. 6 shows the driven shaft angularly disposed from the line of the drive shaft 1. Under such condition, the bearing surface 6 of the flange 5 slides to and fro on the bearing surface 23 of the ring bushing, and both of said bearing surfaces being radial, such "wobble" or angular movement does not produce binding results therein as a wiping and full contact action is at all times obtained under this condition. Simultaneously with the operation of the two last-named bearing surfaces, the spherical bushings 25 slide on their respective transmission rods and the seat 8 of said hub rides with slight angular movement on said spherical bushing. Thus, the ring bushings chiefly guide or centralize the hubs in the housing while the transmission rods and accompanying bushings receive and transmit the torque and angular loads from the driving hub to the driven hub.

What is claimed is:

1. A coupling comprising hubs adapted to be secured to adjacent ends of driving and driven shafts, each hub having a circular flange provided with a curved peripheral face, said flange containing spaced slots extending inwardly from said face having arcuate walls forming a seat therein, a housing enclosing said hubs and having a cylindrical inner wall, bushings slidably mounted in said inner wall of said housing, each bushing slidably receiving the peripheral face of one of said flanges, means connected to said housing extending through the slots in said flanges, and spherical business slidably mounted on said means and engaging said seats in said flanges.

2. In a coupling, a hub member, a circular flange thereon, angularly spaced radial slots in said flange, a housing enclosing said hub member, transmission rods radially spaced and secured within said housing, a bushing slidably mounted within said housing, means for mounting said flange in said bushing for angular movement therein, and means slidably mounted on said rods and slidably engaging in said slots.

3. A coupling comprising flanged hubs adapted to be secured to adjacent ends of driving and driven shafts, a housing enclosing said hubs and having a cylindrical inner wall substantially concentric with said shafts, bushings slidably mounted therein, and adapted to receive the peripheral portions of the flanges of said hubs to mount said hubs for limited angular movement, and rod means rigidly connecting both hubs and said housing against radial movement relative to each other.

4. A coupling comprising flanged hubs adapted to be secured to adjacent ends of driving and driven shafts, a housing enclosing said hubs and consisting of two shell members and an intermediate connecting member, rods extending through said shells and connecting member for securing the same together, said rods also having a connection with said hubs to connect the hubs to the housing against radial movement relative to each other, and means in said housing for receiving peripheral portions of said hubs in diametral contact therewith, whereby upon angular movement of said hub relative to said housing said diametral contact is maintained.

5. A coupling comprising hubs adapted to be secured to adjacent ends of driving and driven shafts, each hub having a circular flange provided with a curved peripheral face, said flange containing spaced slots extending inwardly from said face having arcuate walls forming a seat therein, a housing enclosing said hubs and having a cylindrical inner wall, a cylindrical finish pad on said inner wall, bushings slidably mounted in said finish pads, each bushing slidably receiving the peripheral face of one of said flanges, rods connected to said housing extending through the slots in said flanges and having bearing portions, and spherical bushings slidably mounted on said bearing portions, and engaging the seats in said flanges, all of the slidably moving parts being coincidental with their respective bearings.

6. In a coupling, a circular flanged hub member, a housing enclosing said hub member, a bushing slidably mounted in said housing, said bushing receiving the peripheral portion of the flange of said hub diametral contact therewith whereby upon angular movement of said hub relative to said housing said diametral contact is maintained, and rod means in said housing cooperating with said hub to maintain said hub against radial movement relative to said housing.

CLARENCE J. HAHN.